(12) United States Patent  
Tzadikevitch et al.

(10) Patent No.: US 9,317,518 B2  
(45) Date of Patent: Apr. 19, 2016

(54) DATA SYNCHRONIZATION

(71) Applicant: Hewlett-Packard Development Company, L.P., Houston, TX (US)

(72) Inventors: Gil Tzadikevitch, Rishon Leziyon (IL); Nimrod Nahum, Nitzanei Oz (IL); Ben Cohen, Jerusalem (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 463 days.

(21) Appl. No.: 13/660,643

(22) Filed: Oct. 25, 2012

(65) Prior Publication Data

US 2014/0122422 A1 May 1, 2014

(51) Int. Cl.  
*G06F 17/30* (2006.01)

(52) U.S. Cl.  
CPC .... *G06F 17/30156* (2013.01); *G06F 17/30076* (2013.01); *G06F 17/30179* (2013.01)

(58) Field of Classification Search  
CPC .............................................. G06F 17/30563  
USPC .................................................. 707/600–603  
See application file for complete search history.

(56) References Cited

U.S. PATENT DOCUMENTS

| 7,519,606 | B2 | 4/2009 | Hernandez-Sherrington et al. |
| 8,214,372 | B2 | 7/2012 | Gupta et al. |
| 2004/0093342 | A1 | 5/2004 | Arbo et al. |
| 2007/0226085 | A1 | 9/2007 | Roach et al. |
| 2008/0222171 | A1 | 9/2008 | Charters |
| 2009/0222697 | A1* | 9/2009 | Thakkar et al. ................. 714/38 |
| 2009/0293128 | A1* | 11/2009 | Lippmann .............. H04L 63/20 726/25 |
| 2010/0115100 | A1* | 5/2010 | Tubman et al. ............... 709/227 |
| 2011/0307290 | A1 | 12/2011 | Rolia et al. |
| 2012/0030220 | A1 | 2/2012 | Edwards et al. |
| 2012/0047514 | A1* | 2/2012 | Seo et al. ..................... 718/106 |
| 2012/0079502 | A1* | 3/2012 | Kwan et al. .................. 718/106 |
| 2012/0102075 | A1 | 4/2012 | Breh et al. |
| 2012/0233182 | A1 | 9/2012 | Baudel et al. |
| 2012/0324283 | A1* | 12/2012 | Sorokin et al. ................. 714/18 |
| 2013/0006935 | A1* | 1/2013 | Grisby ......................... 707/635 |

OTHER PUBLICATIONS

Cowan, B.A., "A Tree-to-tree Model for Statistical Machine Translation," Retrieved from http://people.csail.mit.edu/brooke/web/papers/phd.pdf, May 23, 2008, 234 pages, Cambridge, MA, USA.  
Unknown, "Mapping Data with XML Data Configuration Files," Retrieved from http://publib.boulder.ibm.com/infocenter/rentrpt/v1r0m1/index.jsp?topic=%2Fcom.ibm.rational.raer.help.doc%2Ftopics%2Ft_xdccontainer.html, Oct. 2012, 1 page.

* cited by examiner

*Primary Examiner* — Apu Mofiz  
*Assistant Examiner* — Cindy Nguyen  
(74) *Attorney, Agent, or Firm* — Hewlett Packard Enterprise Patent Department

(57) ABSTRACT

An example of synchronizing data can include converting a data tree structure into a dependency graph and reconciling nodes with a target data structure. Synchronizing data can include merging any duplicate information. Furthermore, synchronizing data can include keeping identifiers of reconciled information with non-reconciled information to locate the reconciled information when the remaining information is reconciled.

20 Claims, 4 Drawing Sheets

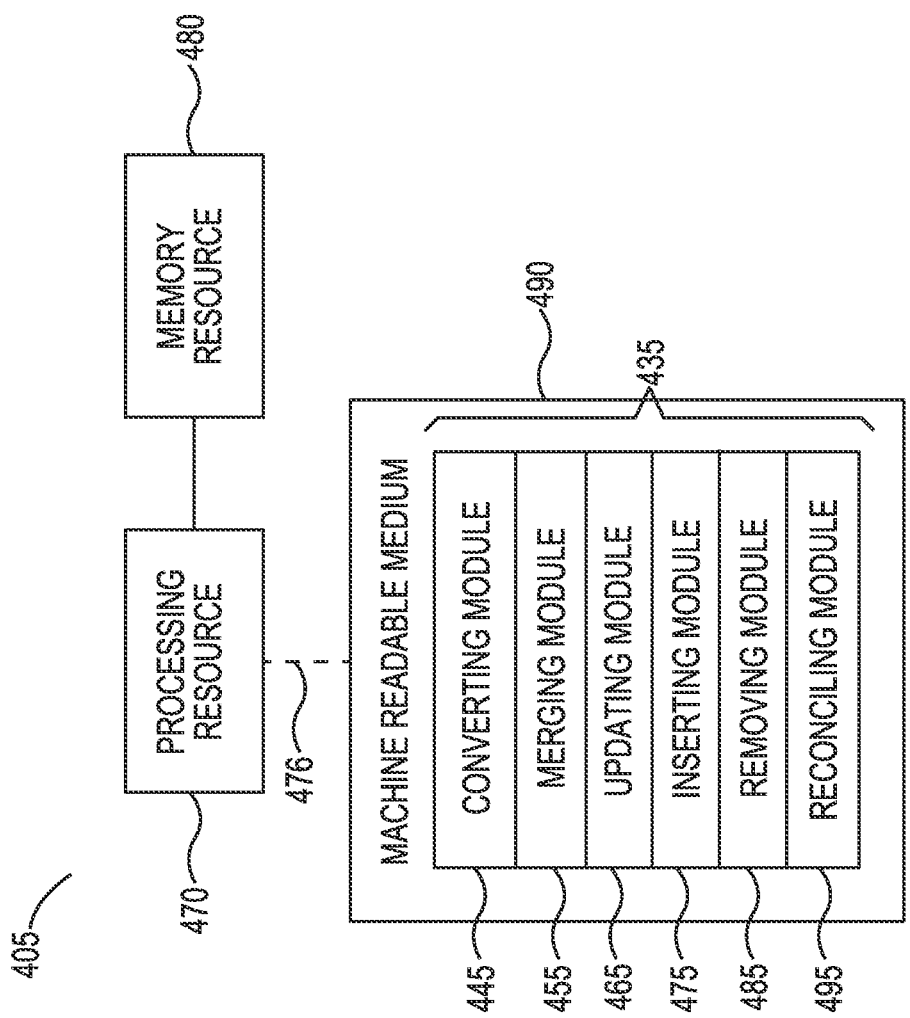

DATA SYNCHRONIZATION

BACKGROUND

A configuration management database (CMDB) can consist of a collection of information related to the components of an information system. A CMDB can represent the authorized configuration of the significant components of an Information Technology (IT) environment. Data synchronization can provide a mechanism to keep one collection of information synchronized with another collection of information.

BRIEF DESCRIPTION OF THE DRAWINGS

FIG. 4 illustrates a diagram of an example of a computing device according to the present disclosure.

DETAILED DESCRIPTION

Figure 1:
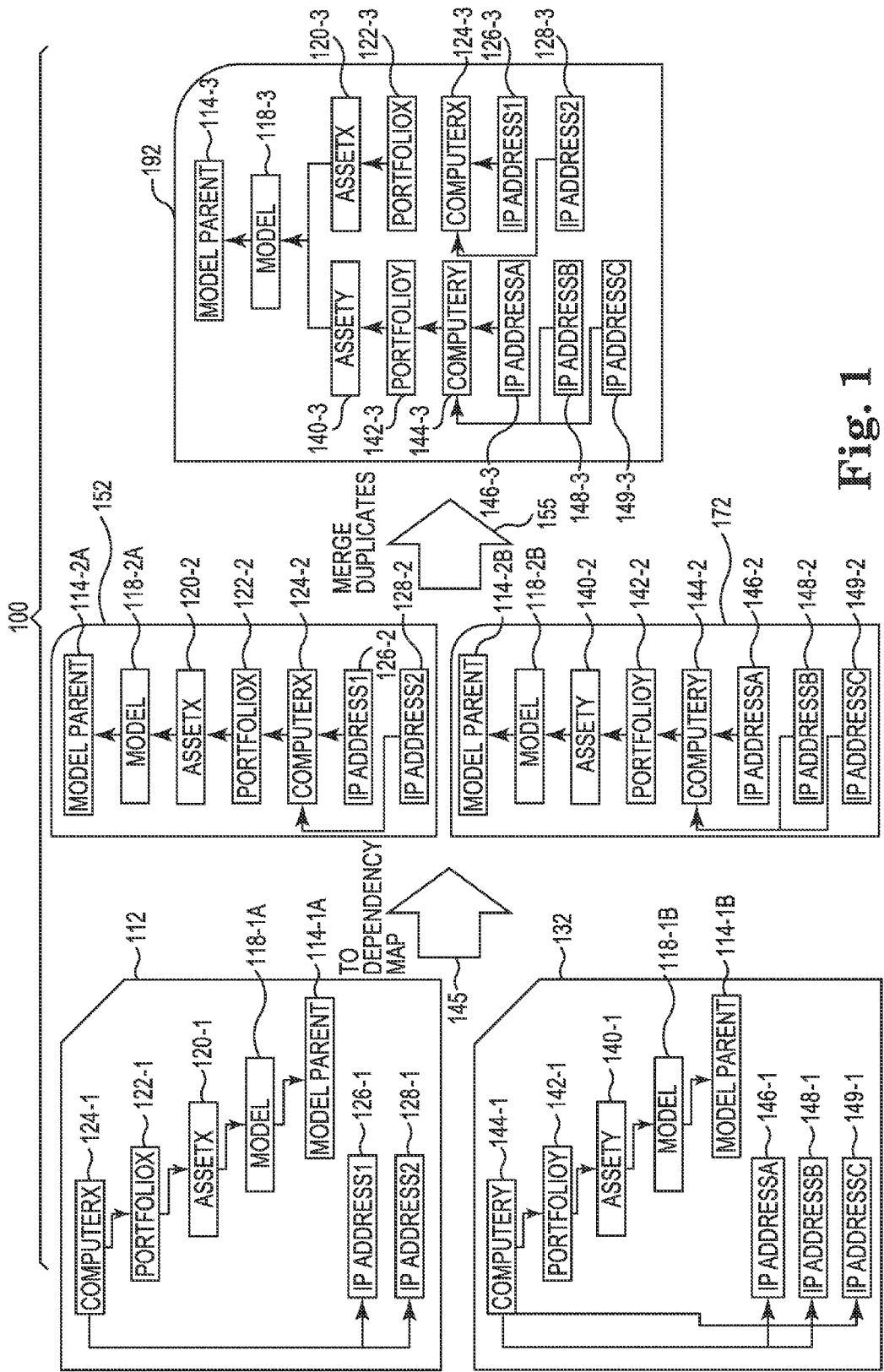
FIG. 1 illustrates an example of a process for data synchronization according to the present disclosure.

Data synchronization, as described herein, can be applicable in multiple domains and in a variety of scenarios where the ordering of data being transferred from one location to another is important. In some examples of the present disclosure, data is pushed from a source location (e.g., a first data environment, database, Universal CMDB (UCMDB), Asset Manager (AM), etc.) to a target location (e.g., a device, a machine, a second data environment, database, UCMDB, AM, etc.). An Asset Manager can discover and track asset inventory.

As the amount of information being transferred from one location to another continues to grow, the efficiency of transferring this data can be affected as the transfers become more and more complex. When the data is interrelated and one piece depends on another, it can become even more complicated as each piece of data may need a particular order of transfer in order for the data to function. A node can have dependents when other nodes depend on the node in order to function or carry out tasks. For example, a database (e.g., a Universal Configuration Management Database (UCMDB)) can contain numerous organized information records that can be transferred to a target location (e.g., a device, a machine, a second data environment, database, UCMDB, AM, etc.) in a particular order, wherein a node in the record can depend on another node to carry out specific functions.

Examples of the present disclosure include methods, systems, and computer-readable and executable instructions for data synchronization. In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 145 may reference element "45" in FIG. 1, and a similar element may be referenced as 445 in FIG. 4. As will be appreciated, elements shown in the various examples herein can be added, exchanged, and/or eliminated so as to provide a number of additional examples of the present disclosure. In addition, as will be appreciated, the proportion and the relative scale of the elements provided in the figures are intended to illustrate examples of the present disclosure, and should not be taken in a limiting sense.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure. As used herein, "a" or "a number of" something can refer to one or more such things. For example, "a number of nodes" can refer to one or more nodes.

Information can be pulled from a database (e.g., a CMDB) and organized in a data tree structure to represent the information and simplify data processing. The data tree structure can be initially organized as a plurality of trees wherein each tree contains a single root node. Each tree can contain a plurality of nodes. Each tree can contain a root node at the top of the tree structure along with all the related nodes that belong to the root node that can be contained below it. A root node can have a node (known as a child node) that is further down the tree from the root node. For example, a root node can be at level 1 (topmost level) of a tree structure. The root node can have a node below it on level 2, which is known as a child node. The root node is called a parent node of the child node.

A node can have dependents when other nodes depend on the node in order to function or carry out tasks. For example, a computer node can depend on a portfolio node to carry out its functions. Therefore, a computer node can be dependent on a portfolio node. The computer becomes a child dependency node of the portfolio. The relationship in a data structure between a child node and a parent node may not be based on a dependency. For example, a child node can be an indication of the location in the tree structure to the parent node not based on a dependent relationship.

A root node can be the only node at level 1 in the tree structure. A root node can have a single child node that is not necessarily dependent on the root node. For example, the tree can include one root node and one child node wherein the child node is not dependent on the root node. A root node can have a plurality of child nodes. For example, a tree can include a root node and three child nodes.

A root node can include a root node record. A root node record can include a dependency definition for each node in the tree structure. For example, a root node record can include a dependency definition of the tree including that a first node is dependent on a second node. In addition, a third node can be dependent on the second node and so forth.

A root node record can include a reference called a dependency reference of all dependencies of a root node and its children. A dependency reference can include information about dependencies of a node. For example, a dependency reference of a root node can include a reference to a child node that depends on the root node. The dependencies of a node can be described by terms including a parent dependency node and a child dependency node for ease of reference. A child dependency node can refer to a node that is dependent on another node (e.g., the child dependency node is dependent on a parent dependency node). A parent dependency node can refer to a node that another node depends on (e.g., a child dependency node that depends on the parent dependency node). For example, a second node can be dependent on a first node. The second node can be the child dependency node of the first node. The first node can be the parent dependency node of the second node.

A node can be a child dependency node, a parent dependency node, neither, or both. For example, a root node can have no child nodes or parent nodes and therefore no dependencies and is neither a child dependency node nor a parent dependency node. A third node can be dependent on a second node. A second node can be dependent on a first node. Therefore, the first node can be a parent dependency node of the second node. The second node can be a parent dependency node of the third node and a child dependency node of the first node.

Each node can include detailed information relating to configuration items (CIs). A CI can be a fundamental structural unit of a configuration management system (e.g., a CMDB). Cis can include items such as nodes, documents, software, databases, and processors, among other network connections within an IT network. The nodes can be reconciled (e.g., pushed or transferred, synchronized, etc.) to a target location (e.g., a database, Asset Manager, etc.).

Reconciling a node can include transferring a node from a dependency graph to a target location (e.g., a device, a machine, a second data environment, database, UCMDB, AM, etc.). The transferring can include determining a particular location for the node in the target location and inserting the information relating to the node in the particular location. For example, a first node (e.g., a computer node) can be placed next to a second node (e.g., an IP address) because of a particular relationship (e.g., the IP address node depends on the computer node, the computer nodes uses the IP address node, the IP address and computer both belong to a particular list of items, etc.).

In some cases, the nodes can have dependency references to other nodes in the database (e.g., Asset Manager). Reconciling (e.g., transferring, relocating, verifying, etc.) a node with particular dependent nodes before the dependent nodes are reconciled can create a loss of the dependency relationship. For example, a parent dependency node can be transferred to a different device before the child dependency node wherein the child dependency node loses its ability to depend on the second node because the child dependency node was not also reconciled to the device. The reconciling of a node can include the node being pushed or transferred to its target location (e.g., a different device), the node can already be present in the target location and can be updated, or the node can already be present in the target location and can be verified.

The reconciling of a node to a target location can be according to an operation type for a particular type of record. An operation type can include an operation that a node in a record can perform. A particular type of record can include a record that includes a particular type of node.

FIG. 1 illustrates an example of a process 100 for data synchronization according to the present disclosure. The process can include converting a source data tree structure (e.g., a data tree structure 112 and/or 132) into a dependency graph (e.g., dependency graph 152) utilizing a computing device (e.g., computing device 400 from FIG. 4). FIG. 1 includes two source data tree structures 112 and 132 containing a Computerx 124-1 root node and a Computery 144-1 root node, respectively.

The source data tree can be a tree created from information in a database (e.g., a CMDB). The source data tree can be created by converting the nodes in the database to a remote data model. The remote data model can comprise a tree structure with defined characteristics of nodes from the database.

In data trees 112 and 132, the arrows designate the root node (e.g., Computerx 124-1 and Computery 144-1, respectively) and their child nodes. For example, Computerx 124-1 has an arrow to IP Address/126-1 and IP Address2 128-1 and, therefore, IP Address/126-1 is a child node of Computerx 124-1. In addition, Computerx 124-1 is a parent node of IP Address/126-1 and IP Address2 128-1. Computerx 124-1 is a parent node of Portfoliox 122-1. Portfolio 122-1 is a parent node of Assetx 120-1. Assetx 120-1 is a child node of Portfolio 122-1. Assetx 120-1 is a parent node of Model 118-1a. Model 118-1a is a parent node of Model Parent 114-1a. In the bottom tree 132, Computery 144-1 is a parent node of all three of IP AddressA 146-1, IP AddressB 148-1, and IP AddressC 149-1. Computery 144-1 is a parent node of Portfolioy 142-1. Portfolioy 142-1 is a parent node of Assety 140-1. Assety 140-1 is a parent node of Model 118-1b. Model 118-1b is a parent node of Model Parent 114-1b.

The node dependencies of each node in the tree structures may not be reflected in the data tree structures 112 and 132. For example, Model Parent 114-1a is a child node of Model 118-1a in source data tree structure 112. However, Model 118-1a depends on Model Parent 114-1a. The converting step represented by arrow 145 converts the tree structures 112 and 132 to dependency graphs 152 and 172, respectively. The converting step 145 can include using the dependency reference from the root node record. The dependency reference can include a reference of node dependencies for each node. For example, the root node record can include a reference that a model node (e.g., Model 118-1a) depends on a model parent node (e.g., Model Parent 114-1a). The converting step 145 can reorganize the data to reflect the dependency of the model node on the model parent node. For example, Computerx 124-1 is a parent node of Portfoliox 122-1 in source data tree structure 112 but in dependency graph 152, Portfoliox 122-2 is a parent dependency node of Computerx 124-2. That is, a child node in the source data tree structure can be converted to a parent dependency node in the target location.

After the converting step 145, IP Address1 126-2 and IP Address 128-2 depend on Computerx 124-2, due to reorganizing the source data tree to reflect dependencies. The dependency graph 152 reflects the dependencies of the nodes from the source data tree structure 112. For example, the Model Parent 114-2a has no parent dependencies as it is the root node of the dependency graph 152. Model 118-2a depends on Model Parent 114-2a (e.g., Model 118-2a is a child dependency node of Model Parent 114-2a). Each child node in the dependency graph reflects a dependency on its parent node. For example, IP Address1 126-2 is a child dependency node of Computerx 124-2 since IP Address1 126-2 depends on Computerx 124-2.

Computerx 124-2 is a parent dependency node of IP Address1 126-2 since Compterx 124-2 is depended on by IP Address1 126-2. Computerx 124-2 depends on Portfoliox 122-2 which depends on Assetx 120-2. Assetx 120-2 depends on Model 118-2a which depends on Model Parent 114-2a. Also note that the Model Parent contains no parent dependency nodes since it is the root node of dependency graph 152.

Dependency graph 172 reflects the dependencies of each of its nodes. For example, Model Parent 114-2b is the root node of dependency graph 172. Going from the root node to the lowest child nodes, the order of dependency graph 172 goes from Model Parent 114-2*b* (e.g., the root node with no parent dependencies), to Model 118-2*b*, to Assety 140-2, to Portfolioy 142-2, to Computery 144-2 to IP Address A 146-2, IP AddressB 148-2, and IP Address C 149-2.

There are duplicate nodes of Model Parents 114-2*a*, 114-2*b* and Models 118-2*a*, 118-2*b*. These duplicate nodes could be reconciled twice as they appear once in each tree, which would decrease performance. The dependency graphs 152 and 172, including their duplicate nodes, can be merged at arrow 155. A duplicate node can include two nodes containing the same or similar information but located in two different data records. For example, if Assetx node depends on a Model node in one dependency graph and Assety node depends on the same Model node in a second dependency graph, a merged dependency graph can have Assetx node and Assety node depend a single Model node in one merged dependency graph. Merging the duplicates can increase efficiency as the amount of information to reconcile can be decreased.

Since both Assetx 120-2 and Assety 140-2 are child dependency nodes of Model 118-2*a* and 118-2*b* respectively, Model 118-2*a* and 118-2*b* can be merged. All child dependency nodes that depend from Model 118-3 in the updated dependency map 192 can have Model Parent 114-3 as their root node. In addition, Model 118-2*a* depends from Model Parent 114-2*a* and Model 118-2*b* depends from Model Parent 114-2*b*. Since these are duplicates, Model Parent 114-2*a* and 114-2*b* can be merged into Model Parent 114-3. All child dependency nodes of Model Parent 114-3 can depend from the same root node in the updated dependency graph 192. The merged dependency graph 192 can be used for reconciling.

Figure 2:
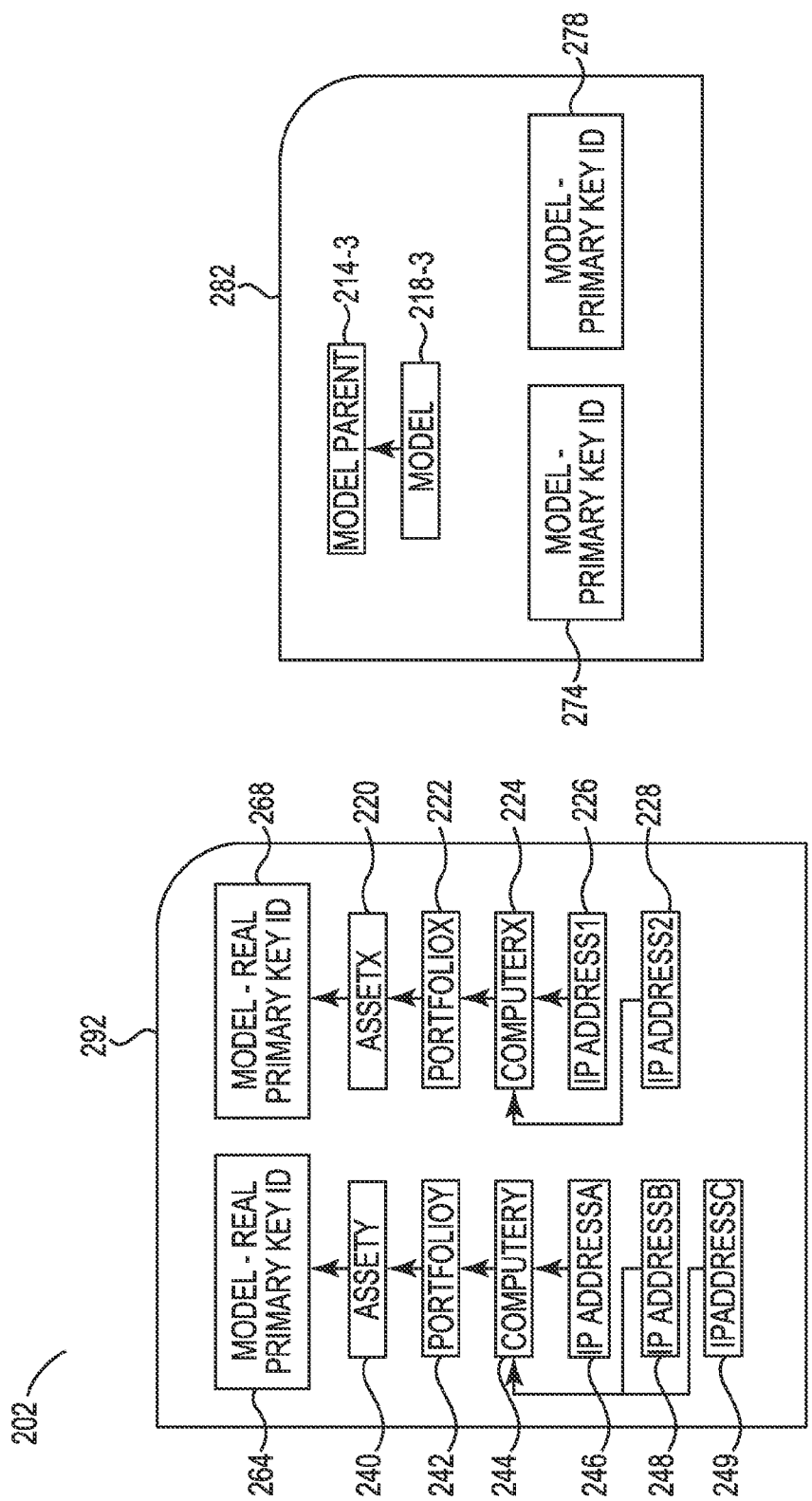
FIG. 2 illustrates an example of a process for using identifiers according to the present disclosure.

FIG. 2 illustrates an example of a process 202 for using a node identifier (e.g., a primary key identification (ID), a real primary key ID, etc.) according to the present disclosure. A node identifier (e.g., a primary key ID, a real primary key ID, etc.) can include information relating to a reconciled node that can be kept with the target location. For example, if a parent dependency node (e.g., a computer node that an IP Address node depends on) is reconciled with a target location, the target location can keep a target node identifier (e.g., a primary key ID) of the computer node. The location of the parent dependency node (e.g., the computer node) in the target location can be held by the target node identifier (e.g., a primary key ID) for when the child dependency node is reconciled.

A child dependency node (e.g., an IP Address node) in the dependency graph can be updated with a source node identifier (e.g., a real primary key ID) of the parent dependency node (e.g., a computer node) that can already be reconciled. The source node identifier (e.g., real primary key ID) can correspond to the target node identifier (e.g., a primary key ID) of the parent dependency node. For example, if a computer node that an IP address node depends on is reconciled, an IP Address node can be updated with the source node identifier (e.g., a real primary key ID) of the computer node. A source node identifier (e.g., a real primary key ID) can include location data related to a parent dependency node already reconciled with the target location. For example, the IP Address node can contain a source node identifier that can match with the target node identifier. In this way, when the IP Address node is reconciled, it can locate the computer node in the target location.

In FIG. 2, Model Parent 214-3 has been reconciled and transferred to a target location 282. The Model Parent 214-3 can be reconciled since it contained a particular number of parent dependency nodes (e.g., zero parent dependency nodes). In addition, Model 218-3 can be reconciled after Model Parent 214-3. Model 218-3 can also be reconciled because the only parent dependency node of Model 218-3 was previously reconciled. Model 218-3 can be a parent dependency node of Assety 240 and Assetx 220. Assety 240 and Assetx 220 can also depend on a parent dependency node and are therefore not able to be reconciled.

Node identifiers can be used here since there are child dependency nodes (e.g., the Assety 240 and Assetyx 220) that cannot be reconciled and whose parent dependency node (e.g., Model 218-3) has been reconciled. Assety 240 can be updated with Model—real primary key ID 264 and Assetx 220 can be updated with Model—real primary key ID 268. Model primary key ID 274 can be kept with the target location 282. Model primary key ID 278 can be kept with the target location 282.

Each node having parent dependencies that have already been reconciled can wait for all of their real primary key IDs corresponding to those parent dependencies to be updated before being placed in the queue to be reconciled. For example, Assety 240 and Assetx 220 can be updated with Model—real primary key ID 264 and Model—real primary key ID 268. However, Assety 240 and Assetx 220 still need to be updated with any already reconciled parent dependency nodes of Assety 240 and Assetx 220 before they can be reconciled.

Figure 3:
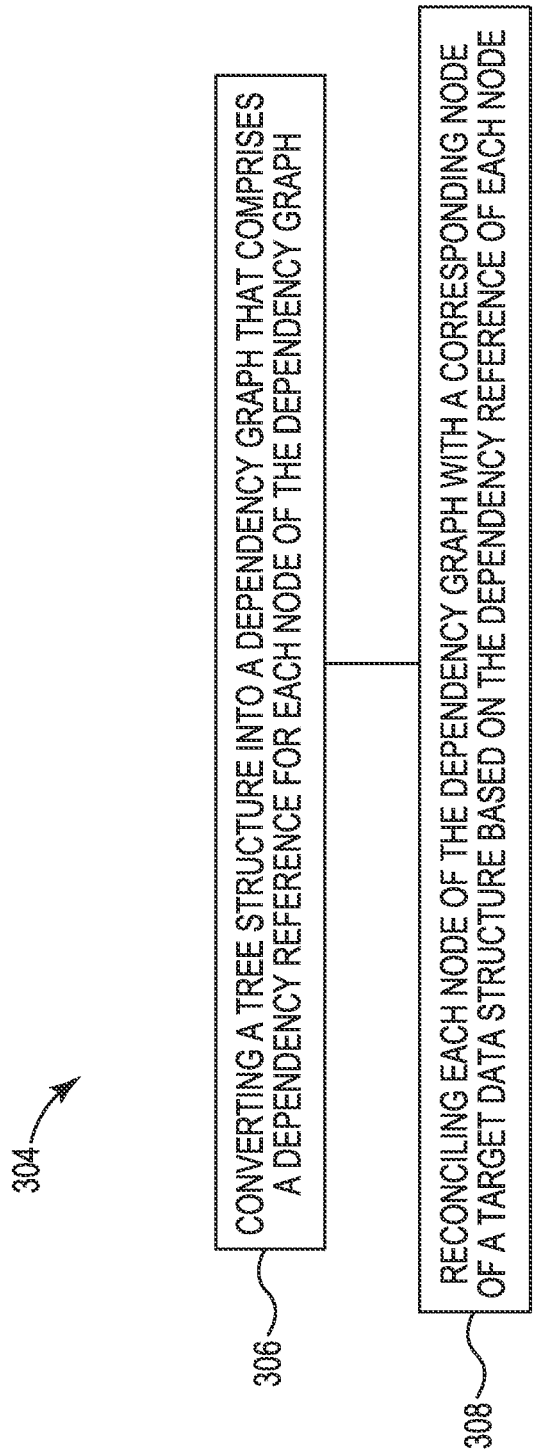
FIG. 3 illustrates a flow chart of an example of method for data synchronization according to the present disclosure.

FIG. 3 illustrates a flow chart of an example of a method 304 for data synchronization according to the present disclosure. At 306, the method includes converting a source data tree structure into a dependency graph. The source data tree structure can comprise a hierarchical tree structure with a collection of nodes (e.g., a root node, parent nodes, child nodes, etc.) for each branch. The source data tree structure can be organized in a variety of ways (e.g., organized by value, organized alphabetically, organized by usage, etc.).

The collection of nodes can include a root node at a highest position in the tree. The root node can have a number of child nodes (e.g., IP Address 1, IP Address 2). Each node can represent a variety of data (e.g., a CI, a database, particular values, a list of other nodes, etc.). Each node can include a representation of communication (e.g., text, words, letters, code, etc.). For example, the representation of communication can be a value of a node that can be a numerical IP address used by a computer.

The dependency graph can include a dependency reference for each node. The dependency reference can designate a number of child dependencies (e.g., 0, 1, 2, 3, etc.) and parent dependencies (e.g., 0, 1, 2, 3, etc.) of the node. For example, a dependency reference can include that an IP address node depends on a computer node, wherein the parent dependency is the computer node.

The dependency graph can also be a merged dependency graph. For example, a merged dependency graph can be an updated dependency graph which includes two dependency graphs whose nodes were merged to form a single dependency graph without duplicate nodes. For example, if a first node (e.g., Assetx) depends on a second node (e.g., Model) in one dependency graph, and a third node (e.g., Assety) depends on the second node (e.g., Model) in a second dependency graph, a merged dependency graph can have the first node (e.g., Assetx) and third node (e.g., Assety) depend on the second node (e.g., Model) in one merged dependency graph. That is, the third node (e.g., Model) is merged into a single node in the merged dependency graph.

The number of dependencies can include zero, one, or a plurality of child and/or parent dependencies. For example, if a child node (e.g., an Asset) depends on a parent node (e.g., a Model), then the child node (e.g., the Asset) can have one parent dependency node (e.g., the Model) and no child dependency nodes. Further, the parent node (e.g., the Model) can have one child dependency node (e.g., the Asset) and no parent dependency nodes. Each node in the dependency graph can have a reference of all parent dependency nodes and all child dependency nodes particular to that particular node.

At 308, each node in the dependency graph is reconciled with a corresponding node in a target location based on the dependency reference for each node. For example, a node in a dependency graph can include the same or similar information as a node in the target location. In addition, a node in the dependency graph can contain data that can be updated into a node in the target location. Further, a node in a dependency graph can be transferred to a target location. In one example, the corresponding node in the target location is in the same location as the dependency graph. In one example, the corresponding node in the target location can correspond to a node based on its shared dependency references. For example, a first node that depends on a second and a third node in the dependency graph can correspond to a fourth node in the target location that depends on two nodes, one with the same or similar information as the second node and the other with the same or similar information as the third node.

Along with transferring a node, reconciling a node can include verifying that the node is in the target location. For example, verifying can include locating the corresponding node in the target location. Reconciling a node can also include verifying that the node in the target location is updated. For example, if a target data node that corresponds to a dependency graph node does not contain the data information of the corresponding dependency graph node, the information in the dependency graph node can be transferred to the corresponding target data node.

The target location can include a variety of structures (e.g., a tree structure, a dependency graph, a merged dependency graph, etc.). For example, the dependency graph used for reconciliation can be a first dependency graph and the target location can be a data structure different than the source data tree. The second dependency graph can be a merged dependency graph.

In one example, the node can be reconciled with a target location (e.g., a device, a machine, a second data environment, database, UCMDB, AM, etc.) by placing a node with a particular number of dependencies into a queue. Once a node comprising a particular number of dependencies is placed in the queue, the method can include reconciling the node in the queue in order to correspond to a target location (e.g., a device, a machine, a second data environment, database, UCMDB, AM, etc.).

In one example, the particular number of dependencies for placing a node in the queue can include zero parent dependencies for that particular node. For example, a computer node that depends on no other nodes can be placed in a queue (e.g., the computer node has no parent dependency nodes). Reconciling a node with a target location can include transferring the node to a target location that does not contain the node. Transferring the node can include moving all or a portion of the information from the node to a corresponding location in the target location (e.g., a device, a machine, etc.). For example, an Internet Protocol (IP) Address from an IP Address node can be transferred from a source data tree structure to a target location.

In one example, reconciling the nodes includes marking a node as failed. A node can be marked as failed if a parent dependency node of the marked node fails to be reconciled. For example, a first node (e.g., a child dependency node) can depend on a second node (e.g., a parent dependency node) and the second node can fail to be reconciled. Therefore, the second node can be marked as failed along with the child dependency node (e.g., the first node). The nodes marked as failed can be placed in a queue (e.g., a separate queue, etc.) of failed nodes that contain both nodes that have failed and nodes with parent dependency nodes that have failed. For example, an IP Address node can depend on a Computer node. If the Computer node fails to be reconciled, the Computer node can be marked as failed along with the IP Address node. The queue of failed nodes can be checked and processed in order to update failed nodes and nodes that depend on the failed nodes. The nodes in the queue of failed nodes can be placed into the queue for reconciling once the failed nodes are able to be reconciled. For example, a node (e.g., a child dependency node, etc.) that depends on a failed node (e.g., a failed parent dependency node, etc.) can be reconciled once the failed node can be reconciled.

FIG. 4 illustrates a diagram of an example of a computing device 400 according to the present disclosure. The computing device 405 can utilize software, hardware, firmware, and/or logic to synchronize data. The computing device 405 can be any combination of hardware and program instructions configured to synchronize data. The hardware, for example can include one or more processing resources 470, machine readable medium (MRM) 435 (e.g., computer readable medium (CRM), database, etc.). The program instructions (e.g., computer-readable instructions (CRI) 435) can include instructions stored on the MRM 490 and executable by the processing resources 470 to implement a desired function (e.g., convert data, merge data, update data, reconcile data, etc.).

MRM 490 can be in communication with a number of processing resources of more or fewer than 470. The processing resources 470 can be in communication with a tangible non-transitory MRM 490 storing a set of CRI 435 executable by one or more of the processing resources 470, as described herein. The CRI 435 can also be stored in remote memory managed by a server and represent an installation package that can be downloaded, installed, and executed. The computing device 400 can include memory resources 480, and the processing resources 470 can be coupled to the memory resources 480.

Processing resources 470 can execute CRI 435 that can be stored on an internal or external non-transitory MRM 490. The processing resources 470 can execute CRI 435 to perform various functions, including the functions described in FIG. 1, FIG. 2 and FIG. 3. For example, the processing resources 470 can execute CRI 435 to implement the conversion from a tree structure to a dependency graph 245 from FIG. 2.

The CRI 435 can include a number of modules 445, 455, 465, 475, 485, 495. The number of modules 445, 455, 465, 475, 485, 495 can include CRI that, when executed by the processing resources 470, can perform a number of functions.

The number of modules 445, 455, 465, 475, 485, 495 can be sub-modules of other modules. For example, a merging module 455 and updating module 465 can be sub-modules and/or contained within the converting module 445 in FIG. 4. In another example, the number of modules 445, 455, 465, 475, 485, 495 can comprise individual modules on separate and distinct computing devices.

A converting module 445 can include CRI that when executed by the processing resources 470 can perform a number of conversions of a tree structure. The conversion of a tree structure can include converting a tree structure of data to a dependency graph. For example, the converting module 445 may include the use of a dependency definition of each record to create a dependency graph wherein each node's dependencies are known. The dependency definition can include a dependency reference. A dependency reference can designate a number of child dependencies and parent dependencies of the node. For example, a dependency reference may include that an IP address depends on a computer.

A merging module 455 can include CRI that when executed by the processing resource 470 can perform a number of merges of nodes (e.g., duplicate nodes in a data structure). The merging of nodes can include merging any duplicate nodes in a tree structure. For example, a duplicate node can be merged to speed up performance and transfer when synchronizing data.

An updating module 465 can include CRI that when executed by the processing resource 470 can perform a number of updates to nodes (e.g., nodes in a data structure). The updating of nodes can include updating a data tree structure (e.g., a tree structure of data, a dependency map of data, etc.) based on a previous merging of data.

An inserting module 475 can include CRI that when executed by the processing resource 470 can perform a number of insertions of data (e.g., nodes into a queue). The insertion of data can include inserting a node from a data structure (e.g., a dependency graph) into a queue. The insertion of data can include only data that has a particular number of dependencies.

A removing module 485 can include CRI that when executed by the processing resource 470 can perform a number of removals of data (e.g., a node in a dependency graph, a node in a queue, etc.). The removal of data can include removing the data to a different location for further processing.

A reconciling module 495 can include CRI that when executed by the processing resource 470 can perform a number of functions including reconciling data from a dependency graph to a target location (e.g., a device, a machine, a second data environment, database, UCMDB, AM, etc.). The reconciling of data can include transferring data from the dependency graph to a target location. The reconciling of data can include verifying that data in a target location corresponds to the data in the dependency graph. The reconciling of data can include updating data in a target location to correspond to data in a source data structure.

The reconciling of data can include holding an identifier (e.g., a primary key ID) in the target location (e.g., a device, a machine, a second data environment, database, UCMDB, AM, etc.) for the reconciled data. The reconciled data can include a reconciled node that comprises a child dependency node and no parent dependency nodes. The reconciled data can include a reconciled node with no dependencies. The reconciling of data can include updating the data dependent on the reconciled node (e.g., a node, a child dependency node, etc.) with an identifier (e.g., a real primary key ID) of the corresponding reconciled node. Reconciling of data can include inserting non-reconciled data into a queue when they are filled with all necessary identifiers (e.g., real primary key IDs) of nodes the non-reconciled nodes depend on but have already been reconciled. The reconciling can include repeatedly reconciling nodes until all nodes are transferred to a target location.

A non-transitory MRM 490, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, as well as other types of computer-readable media.

The non-transitory MRM 490 can be integral, or communicatively coupled, to a computing device, in a wired and/or a wireless manner. For example, the non-transitory MRM 490 can be an internal memory, a portable memory, a portable disk, or a memory associated with another computing resource (e.g., enabling CRIs to be transferred and/or executed across a network such as the Internet).

The MRM 490 can be in communication with the processing resources 470 via a communication path 476. The communication path 476 can be local or remote to a machine (e.g., a computer) associated with the processing resources 470. Examples of a local communication path 476 can include an electronic bus internal to a machine (e.g., a computer) where the MRM 490 is one of volatile, non-volatile, fixed, and/or removable storage medium in communication with the processing resources 470 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 476 can be such that the MRM 490 is remote from the processing resources e.g., 470, such as in a network connection between the MRM 490 and the processing resources (e.g., 470). That is, the communication path 476 can be a network connection. Examples of such a network connection can include a local area network (LAN), wide area network (WAN), personal area network (PAN), and the Internet, among others. In such examples, the MRM 490 can be associated with a first computing device and the processing resources 470 can be associated with a second computing device (e.g., a Java®server). For example, a processing resource 470 can be in communication with a MRM 490, wherein the MRM 490 includes a set of instructions and wherein the processing resource 470 is designed to carry out the set of instructions.

The processing resources 470 coupled to the memory resources 480 can execute CRI 435 to convert data of a source tree structure to a dependency data structure. The processing resources 470 coupled to the memory resources 480 can also execute CRI 435 to merge a data structure with duplicate data into a data structure with no duplicate data. The processing resources 470 coupled to the memory resources 480 can also execute CRI 435 to update a data structure based on a previous merging of data. The processing resources 470 coupled to the memory resources 480 can also execute CRI 435 to insert data into a queue when the data has no parent dependencies. The processing resources 470 coupled to the memory resources 480 can also execute CRI 435 to remove data from the queue to be reconciled with a target location. Furthermore, the processing resources 470 coupled to the memory resources 480 can also execute CRI 435 to reconcile data of a source data structure with a target location.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A non-transitory machine-readable medium storing a set of instructions executable by a processor to cause a computer to:
   convert a source data tree structure into a dependency graph that comprises a dependency reference for each of a plurality of nodes of the dependency graph, wherein the dependency reference for each node comprises a number of parent dependency nodes and a number of child dependency nodes;
   merge duplicate nodes in the dependency graph together into a merged node;
   update the dependency graph based on the merge;
   insert the merged node into a queue;
   insert a child node of the merged node into the queue; and
   reconcile the merged node in the queue with a first corresponding node of a target location based on the dependency reference of the merged node, and after the merged node is reconciled, reconcile the child node with a second corresponding node of the target location based on the dependency reference of the child node.

2. The non-transitory machine-readable medium of claim 1, wherein inserting the merged node includes relocating the merged node from the dependency graph to the queue when the node contains no parent dependency nodes before the merged node is subsequently reconciled with the target location.

3. The non-transitory machine-readable medium of claim 1, wherein reconciling the merged node comprises verifying that the merged node is in the target location according to an operation type for a particular type of record of the merged node.

4. The non-transitory machine-readable medium of claim 1, wherein reconciling the merged node comprises updating the merged node in the target location according to an operation type for a particular type of record of the merged node.

5. The non-transitory machine-readable medium of claim 1, wherein reconciling the nodes comprises holding a primary key identification (ID) with the target location for each reconciled node comprising a child dependency node.

6. The non-transitory machine-readable medium of claim 5, comprising updating all child dependency nodes with a real primary key ID of the corresponding reconciled node.

7. The method of claim 1, wherein reconciling the merged node and child node with the first and the second corresponding nodes of the target location comprises verifying the merged node and child node are already in the target location.

8. The non-transitory machine-readable medium of claim 1, wherein reconciling the notes includes marking as failed a node that comprises a parent dependency node that failed to be reconciled.

9. A method for synchronizing data, comprising:
   utilizing a processor to execute instructions located on a non-transitory medium for:
      converting a source data tree structure into a dependency graph that comprises a dependency reference for each node of a plurality of nodes;
      placing a merged node of the plurality of nodes in a queue when the node has a number of dependencies;
      removing the merged node from the queue to be reconciled;
      reconciling the merged node in the dependency graph with a first corresponding node of a target location based on the dependency reference of the merged node; and
      after reconciling the merged node, reconciling a child node of the merged node in the dependency graph with a second corresponding node of the target location based on the dependency reference of the child node.

10. The method of claim 9, wherein the dependency reference for each node comprises a number of parent dependency nodes and a number of child dependency nodes.

11. The method of claim 9, wherein the number of dependencies comprises no parent dependency nodes.

12. The method of claim 9, wherein a node in the queue is reconciled to the target location.

13. The method of claim 9, wherein the source data tree structure is organized by at least one of value, alphabet, and usage.

14. A system for synchronizing data, the system comprising a processing resource in communication with a non-transitory machine readable medium, wherein the non-transitory machine readable medium includes a set of instructions and wherein the processing resource is designed to carry out the set of instructions to:
   convert a source data tree structure into a dependency graph that comprises a dependency reference for each of a plurality of nodes, wherein the dependency reference for each node comprises a number of parent dependency nodes and a number of child dependency nodes;
   merge duplicate nodes in the dependency graph together into a merged node;
   update the dependency graph based on the merge;
   insert the merged node of the plurality of nodes in the dependency graph into a queue;
   insert a child node of the merged node in the dependency graph into the queue;
   remove the merged node and the child node out of the queue; and
   reconcile the merged node removed from the queue with a first corresponding node of a target location based on the dependency reference of the merged node, and after the merged node is reconciled, reconcile the child node with a second corresponding node of the target location based on the dependency reference of the child node.

15. The system of claim 14, wherein reconciling the merged node and the child node comprises transferring the reconciled merged node and the reconciled child node to the target location.

16. The system of claim 14, wherein reconciling the merged node and the child node comprises holding a primary key identification (ID) with the target location for each reconciled node comprising a child dependency node and updating all child dependency nodes with a real primary key identification of the corresponding reconciled node.

17. The system of claim 16, wherein the updated node is inserted into a queue when filled with real primary key IDs that correspond to each of the parent dependency nodes of the updated node.

18. The system of claim 14, wherein the nodes are repeatedly reconciled until all nodes are transferred to the target location.

19. The system of claim 14, wherein the target location is a data structure different than the source data tree.

20. The system of claim 14, wherein reconciling the merged node and the child node removed from the queue with the first and the second corresponding nodes of the target location comprises verifying that the first and the second corresponding nodes already in the target location are updated.

\* \* \* \* \*